Feb. 4, 1941.  E. D. L. BOWMAN ET AL  2,230,927
TRUCK DRIVER'S LOG HOLDER AND MARKER
Filed Oct. 7, 1938   2 Sheets-Sheet 1
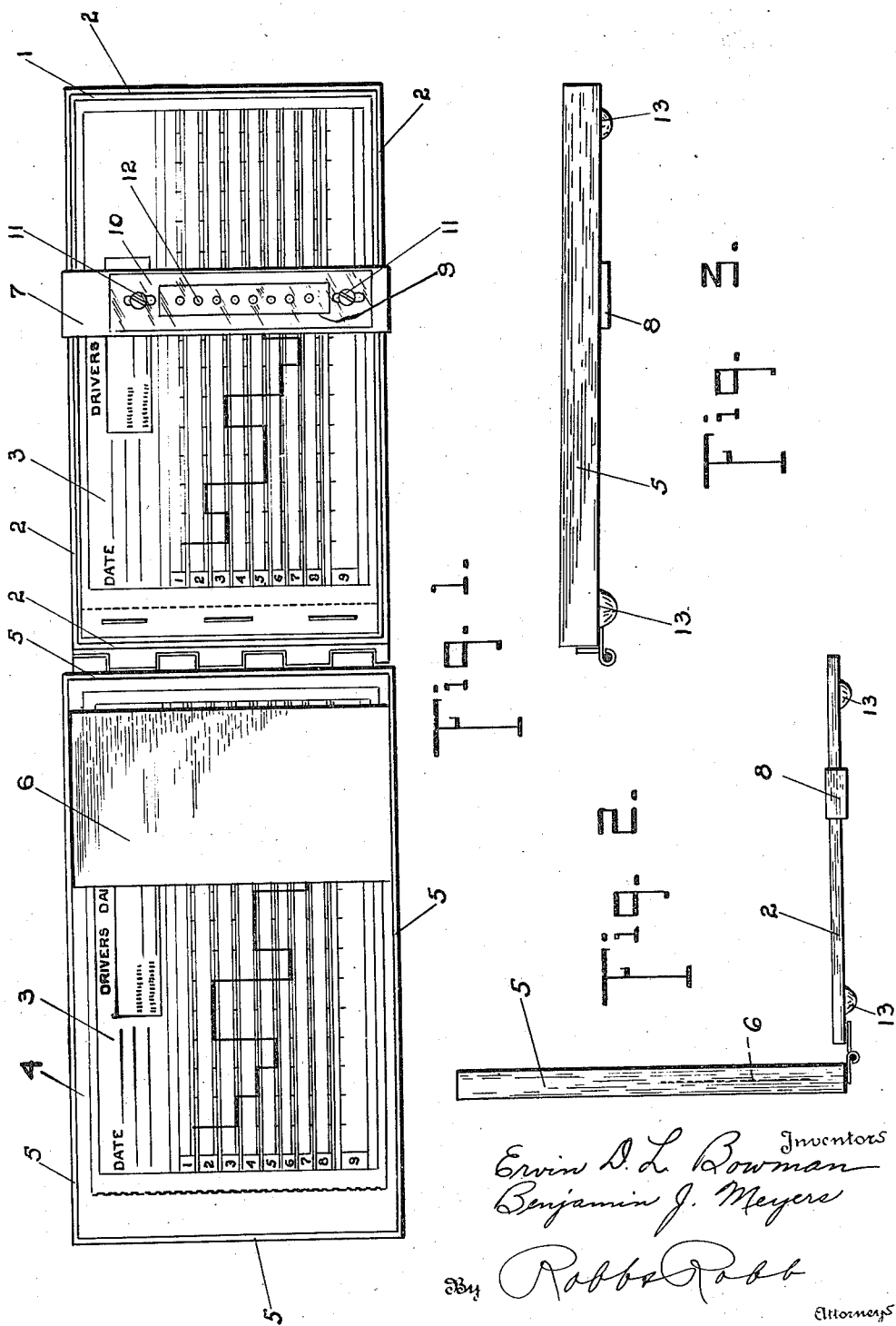

Figures 4, 5:
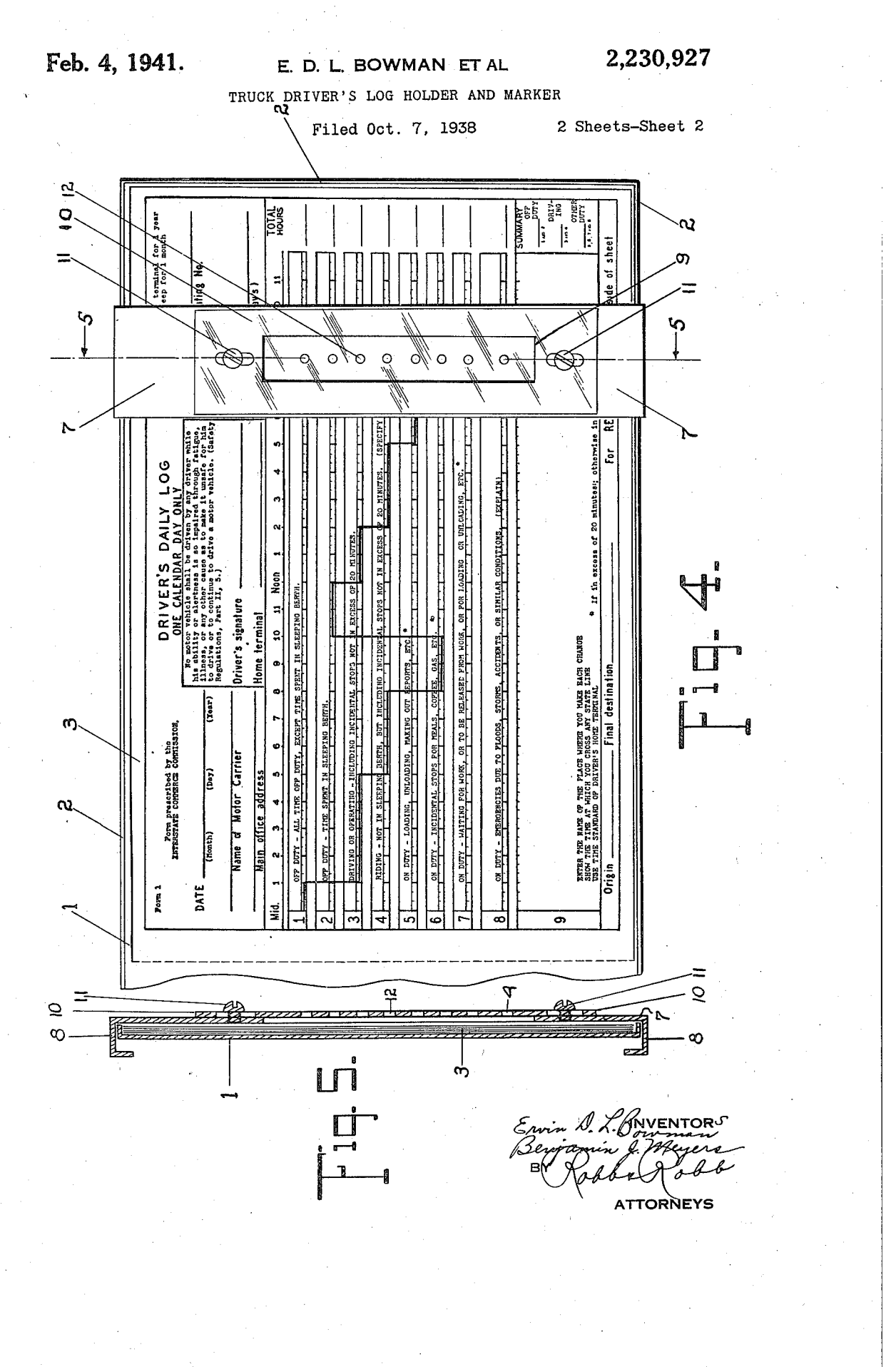

Feb. 4, 1941.  E. D. L. BOWMAN ET AL  2,230,927
TRUCK DRIVER'S LOG HOLDER AND MARKER
Filed Oct. 7, 1938  2 Sheets-Sheet 2

INVENTORS
Erwin D. L. Bowman
Benjamin J. Meyers
BY Robb & Robb
ATTORNEYS

Patented Feb. 4, 1941

2,230,927

UNITED STATES PATENT OFFICE 2,230,927

TRUCK DRIVER'S LOG HOLDER AND MARKER

Ervin D. L. Bowman, Fairview Village, and Benjamin J. Meyers, Cleveland, Ohio

Application October 7, 1938, Serial No. 233,858

2 Claims. (Cl. 33—80)

The present invention comprises a log holder and marker, designed primarily for use by drivers of vehicles in the nature of public carriers, such as trucks, truck trailers, and the like, in state and interstate commerce.

Under regulations promulgated and in force by the Interstate Commerce Commission, drivers of trucks and like vehicles are required to keep a daily log of the operation of the vehicles which are handled or driven by such drivers.

This daily log comprises a series of daily log sheets of a form prescribed by the Interstate Commerce Commission, or such form might be prescribed by a State commission, if a state law makes similar requirements to the Federal laws.

The daily log sheets are bound up in tablet form usually, and are provided in duplicate for each daily record, the sheets being adapted to be torn from the tablet binding portion for filing as required by law. One of the duplicate log sheets is required to be kept in the possession of the driver at all times during the month, and the other log sheet is intended to be kept by the employer of the driver, usually a trucking concern.

Now in the handling of the log sheets, the driver is required to mark the same in a somewhat peculiar manner with indicia lines to indicate the period of time which he is off duty, the time spent in his sleeping berth, his time of operating the truck, the time he puts in making out reports, the time he spends at meals, and other information which is specified upon the log sheet.

Heretofore, so far as we are aware, no convenient means for handling the log sheets by way of storage and carrying the sheets in reserve for use, and no convenient way of marking the sheets in a neat and workman-like manner have been provided.

The present invention, therefore, embodies as suggested before, a holder of special type that makes very easy the use of the log sheet tablet, the storage of the daily sheets which the driver is required to keep for a period of a complete month's record, the holder involving a peculiar marking appliance by which longitudinal and transverse lines may be marked on each log sheet, and its duplicate copies, which lines indicate in conjunction with the indicia on the log sheets just how the time of the driver in operating the truck and when not operating the truck, is divided; also giving other features of information that the daily log sheet form calls for.

The holder of the invention is preferably in the form of a metal container comprising a compartment cover in which the driver's daily log sheets are stored, after the record thereon is made each day, in respect to the driver's copies.

The container embodies also a working compartment, so to speak, in which the tablet of log sheets in reserve for use is arranged, and with which latter compartment there is associated the marking appliances referred to that enables the driver by the use of a pencil to accurately apply to the duplicate log sheets for each day's record, the necessary longitudinal and transverse lines that denote the manner in which his time is divided up in his performance of his duties, and other records that are desired to be made, and required to be made in fact, under the law.

A full understanding of the invention will be had upon reference to the following description in conjunction with the accompanying drawings, in which:

Figure 1 is a plan view showing the holder and marking appliance of the invention in open condition, as when in use, one of the sheets in the working compartment or back of the holder or container being indicated as when marked on the completion of a day's work by the driver, the storage container showing how the driver's log sheets are stored in the storage compartment which is the front or top of the container, so to speak.

Figure 2 is an edge view of the container showing how the parts thereof would be adjusted when the operator is making a record on his daily record or log sheet, the pencil of the operator being disposed in proper relation to the marking appliance.

Figure 3 is a front edge view showing the container or holder closed as when not in use.

Figure 4 is a top plan view illustrating primarily the working side or compartment of the log holder, the details of the log sheet, and arrangement of the marking appliance thereover, the working compartment of the holder being broken away.

Figure 5 is a cross sectional view taken about on the line 5—5 of Figure 4, and bringing out more clearly the detail construction of the sliding, marking appliance, carried by the working compartment.

Referring to the drawings, it will be observed that the log holder and marking device of the invention, comprises a container which may be characterized as consisting of a bottom or storage compartment 1, in the form of a rectangular some-what box-like structure equipped with the edge flanges 2 and of relatively shallow form, though sufficiently deep to readily receive a month's supply of daily log sheets 3 to be disposed therein, in a convenient position to be marked by the operator or driver of the truck or vehicle for which the daily log is to be kept.

Hinged to the left hand end of the working compartment or bottom member 1, is the top 4 of the container, which is hereinafter termed the storage compartment, in which the log sheets which are retained by the driver for the period of thirty days, or each month of operation, will be kept in proper order without liability of loss or accidental displacement. The top 4 of the container is very similar to the bottom member 1, except that the edge flanges 5 are deeper so that the top or compartment 4 will hold very readily quite a large number of log sheets.

The top or storage compartment 4 is also somewhat larger in area than the bottom or working compartment 1, so that the latter will fit into, or be received by the member 4 when the latter is closed down on the member 1, thus providing virtually a box-like container, as heretofore mentioned.

In the top member or storage compartment 4 is disposed cross-wise thereof, a retaining plate 6 beneath which the log sheets are disposed, in order to prevent them from becoming displaced, and this retaining plate 6 is connected with upper and lower flanges 5 of the part 4 a sufficient distance below the free edges of said flanges to permit the top member 4 to receive the relatively shallow working compartment or bottom member 1, when the parts are closed together.

It will be seen that the log sheets 3 are provided with a very considerable amount of printed data, or indicia, as particularly shown in Figure 4 of the drawings, and, therefore, some convenient and quick method of marking the period of time called for on this log sheet is desirable.

Heretofore, it has been the requirement that the driver of the truck, by the use of a pencil, shall draw longitudinal and transverse lines on the log sheet as a mode of showing the manner in which his time is to be recorded in reference to the different indicia on the longitudinal lines of the log sheet. Since it is difficult to make these longitudinal and transverse or cross-wise lines readily by free hand, the invention contemplates the use of a marking appliance, which consists of the marker slide 7 in the form of a plate extending transversely to the bottom or working compartment of the container, said marker slide, when in use, crossing transversely the log sheet 3 that is disposed at the top of the tablet or bound section of log sheets.

As previously stated, the log sheets are made in duplicate, so one carbon is interposed between the top sheet and the duplicate sheet. The carbon may be removed, of course, and replaced beneath other sheets, after the particular day's log has been recorded on the top sheet of the bound section or tablet of sheets that are arranged and retained in the compartment 1 for active use each succeeding day.

The slide 7 consists of a plate formed with top and bottom angle flanges 8. These flanges 8 are sufficiently deep to extend around the upper and lower edge flanges 2 of the bottom compartment 1 and permit free sliding of the marker slide longitudinally of the log sheet, and therefore, longitudinally of the member 1, in the manipulation of the marker when used in conjunction with a pencil that does the actual marking work.

The transverse edges of the marker slide 7 are straight edges so a pencil may be contacted therewith and slid cross-wise along these edges to make a transverse mark on the log sheet. Intermediate the transverse edges of the marker slide, the latter is formed with a rectangular opening 9, and upon the outer surface of the slide is carried a transparent plate 10, preferably made out of Celluloid, or any suitable composition material. The plate 10 is affixed to the slide 7 by screws or fastenings 11, which pass through the longitudinal slots from the plate 10, thus permitting, if necessary, a slight relative sliding movement of the plate 10 upon the marker slide 7. The plate 10 is provided with a series of openings 12 longitudinally thereof, and opposite the space provided by the rectangular opening 9 of the slide 7. The said openings are of sufficient size to permit the driver or operator of the vehicle to pass therethrough the sharpened point of a pencil by which he will mark his record upon the log sheet 3. The openings 12 are intended to lie or be adjusted to lie opposite the longitudinal indicia lines that are associated with the edge indicia numbers 1 to 8 inclusive, located at the left hand end of the log sheet 3.

The purpose of the above arrangements will clearly be set forth in describing the operation of the invention.

It is notable furthermore that the bottom member or working compartment of the container of the invention has downwardly pressed lugs 13 thereon, the purpose of these lugs being to support the device of the invention when the operator is making a record on his log sheet located in the compartment 1 or bottom member of the device. In other words, the parts 13 constitute little legs or feet that space the body portion of the member 1 from a surface on which it is resting when the record is being made, and this is desirous because if such surface is a flat one, sufficient space is afforded to permit the free sliding of the angle flanges 8 longitudinally of the member 1, for effecting the marking operation, as will now be set forth.

It will be assumed that the truck driver is making a log of the 15th day of operation of his truck in a certain month. There will be stored in the storage compartment or top section of the container, designated 4, fourteen log sheets 3 which are duplicates of those which he has made in duplicate each day for the first fourteen days of the month. The said log sheets 3 will be held in the storage compartment by means of the retaining plate 6, as previously described. During the day of operation of the truck, the 15th day of the month according to this empirical description, the driver from time to time opens his log and makes his entry or marking on the log sheet, having, of course, first previously filled out the blank spaces for the date, his name, carrier firm, address, and his home termination. To make the proper marking on the log sheet, he will form a longitudinal mark for the period of time he is off duty, and similar longitudinal marks for other periods of time of his work or inactivity that are called for by the printed indicia on the lines designated 1 to 8 inclusive of the log sheet.

Underneath the printed indicia are hour and one-third division indicia marks running from the first hour after midnight to the last hour before midnight. To make a longitudinal pencil line on the required indicia line of the log sheet, the driver places his pencil in one of the openings 12, causes the pencil to contact with the log sheet, and moves the pencil longitudinally the required hours or one-third of an hour's time. After so doing, he can close up the log container and put it away.

Assuming that he wishes to make a mark on another of the indicia lines of the log sheet for a later record, he places his pencil at either one of the tranverse edges of the slider 7 and draws a cross-wise line to carry his previous longitudinal line down to the next longitudinal line which he is to form on the sheet.

The slider 7 will move fairly accurately because it is guided in its longitudinal movement on the member 1 by the angle flanges 8. Likewise, the said slider is always disposed at a correct right angle to the longitudinal lines of indicia on the log sheet, and an accurate vertical line can at any time be made on the log sheet, as will be obvious from the foregoing description.

Should the printed log sheets have some slight variation in the location of their longitudinal log lines designated 1 to 8 inclusive, and it be necessary that the openings 12 be slightly adjusted relatively to the slider 7, the driver can readily, by the use of his pencil, move the transparent plate 10 slightly cross-wise in either direction on the slide 7, and thus cause a correct register of the eight various openings 12, with the eight main indicia lines on the log sheet, whereby the drawing of the longitudinal lines in the use of the pencil will be accurately made on the hour markings for said indicia lines.

By the use of the invention, the operator has a convenient holding device for his log sheets both when they are stored and when they are in their operating or working position in the working compartment or bottom 1 of the container. The container being made of metal, provides a rigid structure of sufficient bulk as not to be liable to be lost, and will house the log sheets in an excellent manner to protect them against being torn.

Of course, at the end of each day, the driver will have completed his markings on the log sheet for that day, will transfer the log sheet which he is required to retain, to the left hand or storage compartment 4 of the container, and will do the necessary in respect to his two duplicate log sheets in so far as these sheets have to be disposed of according to state or interstate regulations involving the filing and recording of the daily log indicia.

It is noted that the movement of the marker slide 7 permits it to be disposed on the bottom member 1 in a position such that when the top member 4 of the container is closed down on the bottom member, the slide 7 will not interfere with the closing because it is adjustable to a position between the free end of the top member and the retaining plate 6 so as to be out of the way of the plate 6 when the container is closed.

Having thus described our invention, what we claim as new and desire to secure by Letters Patent of the United States, is:

1. A log sheet holder and marking device, comprising a bottom member and a top member, the top member being in the form of a compartment having side members provided with outer edges defining an opening thereto, a retaining plate secured to said side members at points spaced inwardly of said outer edges and extending crosswise thereof thereby separating said compartment into inner and outer compartments, said plate having an area less than the area of said opening to provide a secondary opening permitting the insertion of log sheets into said inner compartment, a marker slide shiftable across the bottom member, and said bottom member having means for holding log sheets beneath the marker slide and being receivable within said outer compartment with the marker disposed in the secondary opening of the top member and at one side of the retaining plate so as to be restrained by the latter against substantial movement when the bottom member is received by the top member as aforesaid.

2. A log sheet holder and marking device, comprising a bottom member for supporting log sheets to be marked with transverse and longitudinal lines thereon and a marker slide associated with said bottom member and extending transversely across the same and shiftable longitudinally thereof, said marker slide having a straight edge for cooperation with a pencil, and being provided with a series of openings at intervals in its length through which a pencil point may be passed for work on a log sheet, said marker slide comprising a transparent plate adjustable thereon and formed with the openings above referred to, the marker slide further having angle flanges at its upper and lower portions to engage around the upper and lower edges of the bottom member, said bottom member having feet projecting downwardly therefrom to space the same from a surface on which it may rest and permit free sliding movement of the marker slide relative to said bottom member.

ERVIN D. L. BOWMAN.
BENJAMIN J. MEYERS.